United States Patent
Sprute

(10) Patent No.: US 9,562,454 B2
(45) Date of Patent: Feb. 7, 2017

(54) EXHAUST GAS TREATMENT DEVICE, METHOD FOR PROCESSING EXHAUST GAS, AND MOTOR VEHICLE

(75) Inventor: Jörg Sprute, Wahrenholz (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/240,772

(22) PCT Filed: Aug. 8, 2012

(86) PCT No.: PCT/EP2012/003387
§ 371 (c)(1),
(2), (4) Date: Feb. 25, 2014

(87) PCT Pub. No.: WO2013/026533
PCT Pub. Date: Feb. 28, 2013

(65) Prior Publication Data
US 2014/0202136 A1    Jul. 24, 2014

(30) Foreign Application Priority Data

Aug. 25, 2011 (DE) .......................... 10 2011 111 590

(51) Int. Cl.
*F01N 3/10* (2006.01)
*F01N 3/20* (2006.01)
(Continued)

(52) U.S. Cl.
CPC ................ *F01N 3/10* (2013.01); *F01N 3/035* (2013.01); *F01N 3/106* (2013.01); *F01N 3/2066* (2013.01);
(Continued)

(58) Field of Classification Search
CPC ...... F01N 13/02; F01N 3/0842; F01N 3/0814; F01N 3/2066; F02D 41/0275; F02M 25/0718; F02M 25/0709; F02M 25/0737; F02M 25/0734; F02B 3/06
(Continued)

(56) References Cited

U.S. PATENT DOCUMENTS 7,877,990 B2 *   2/2011   Buerglin et al. ................ 60/320
2008/0022677 A1 *   1/2008   Barbe ..................... F02B 37/00
                                                        60/599
(Continued)

FOREIGN PATENT DOCUMENTS

CN          101828011 A        9/2010
DE          101 55 675          5/2003
(Continued)

OTHER PUBLICATIONS

Machine Translation, KR 1020070033599, Translated Mar. 2016.*
(Continued)

*Primary Examiner* — Patrick Maines
(74) *Attorney, Agent, or Firm* — Pearl Cohen Zedek Latzer Baratz LLP

(57) ABSTRACT

The invention relates to an exhaust-gas treatment device for processing exhaust gas from a combustion aggregate, especially a diesel engine. Moreover, the present invention relates to a method for processing exhaust gas from a combustion aggregate by means of selective catalytic reaction, and it also relates to a motor vehicle in which the method according to the invention is implemented or which has the exhaust-gas treatment device according to the invention. It is provided that the exhaust-gas treatment device comprises an exhaust-gas system and, arranged in it, an oxidation catalyst, a reduction catalyst for selective catalytic reduction, and a particle filter, whereby the oxidation catalyst is arranged upstream from the reduction catalyst and the reduction catalyst is arranged upstream from the particle (Continued)

filter. The reduction catalyst (50) is arranged in the exhaust-gas system (20) so far upstream in the direction of flow (23) of the exhaust gas that the heat of the exhaust gas passing the reduction catalyst (50) is sufficient to bring the reduction catalyst (50) to the operating temperature.

11 Claims, 7 Drawing Sheets

(51) Int. Cl.
  *F01N 3/035* (2006.01)
  *F01N 13/00* (2010.01)
(52) U.S. Cl.
  CPC ......... *F01N 13/009* (2014.06); *F01N 13/0097* (2014.06); *F02M 26/15* (2016.02); *F02M 26/30* (2016.02); *F01N 2340/02* (2013.01); *F01N 2610/02* (2013.01); *F01N 2610/11* (2013.01); *F01N 2610/1453* (2013.01); *F02M 26/06* (2016.02); *Y02T 10/24* (2013.01)
(58) Field of Classification Search
  USPC .......... 60/274, 278, 295, 298, 301; 123/542, 123/568.12, 559.1
  See application file for complete search history.

(56) References Cited

U.S. PATENT DOCUMENTS

| | | | |
|---|---|---|---|
| 2008/0202101 A1* | 8/2008 | Driscoll | F01N 3/035 60/286 |
| 2008/0314036 A1* | 12/2008 | Yokoyama et al. | 60/303 |
| 2009/0193794 A1* | 8/2009 | Robel | F02M 25/0718 60/295 |
| 2009/0241906 A1 | 10/2009 | Osbat et al. | |
| 2010/0242439 A1 | 9/2010 | Domon et al. | |
| 2012/0124983 A1* | 5/2012 | Hong | 60/324 |
| 2013/0340413 A1* | 12/2013 | Chandler | B01D 53/9422 60/297 |
| 2014/0090362 A1* | 4/2014 | Eckhoff | F01N 3/0821 60/274 |
| 2014/0123630 A1* | 5/2014 | Eckhoff | F01N 3/035 60/274 |
| 2015/0240752 A1* | 8/2015 | Chandler | B01J 23/34 60/278 |

FOREIGN PATENT DOCUMENTS

| | | |
|---|---|---|
| DE | 102 50 050 | 5/2004 |
| DE | 103 47 133 | 6/2004 |
| DE | 103 48 799 | 6/2004 |
| DE | 103 23 607 | 12/2004 |
| DE | 103 00 298 | 9/2005 |
| DE | 10 2007 056 202 | 11/2007 |
| DE | 10 2008 051 496 | 5/2009 |
| DE | 10 2009 027185 A1 | 12/2010 |
| EP | 2 105 592 A1 | 9/2009 |
| EP | 2 500 538 | 9/2012 |
| FR | 2955612 | 7/2011 |
| FR | 2955612 A1 * | 7/2011 |
| JP | 2009097479 A * | 5/2009 |
| JP | 2009156077 A * | 7/2009 |
| JP | 2009167806 A * | 7/2009 |
| JP | 2011202512 A * | 10/2011 |
| KR | 1020070033599 * | 3/2007 |
| KR | 100892525 B1 * | 4/2009 |
| WO | WO 2009/065555 | 5/2009 |
| WO | WO 2010149410 A1 | 12/2010 |
| WO | WO 2012/110720 | 8/2012 |
| WO | WO 2012/123660 | 9/2012 |

OTHER PUBLICATIONS

International Search Report Issued for PCT International Application No. PCT/EP2012/003387, mailed Feb. 28, 2013.
German Search Report issued for German Patent Application No. 102011111590.4, mailed Apr. 24, 2012.
Office Action for Chinese Patent Application No. 201280041448.7, Issued Jul. 29, 2015.
Ford, "6.4L Power Stroke® Diesel Engine—Mid-Atlantic Equipment", Ford International Truck and Engine Corporation (2007), pp. 16-20. (available at http://mid-atlanticema.org/wp-content/uploads/6.4L-Power-Stroke-update2.pdf).
Ford, "6.0 Power Stroke 2003.25 "F" Series Super Duty Features Descriptions Unique Service Procedures and General Diagnostic", Ford International Truck and Engine Corporation (2002), pp. 31-38. (available at http://www.powerstrokediesel.com/docs/EF_456.pdf).

* cited by examiner

EXHAUST GAS TREATMENT DEVICE, METHOD FOR PROCESSING EXHAUST GAS, AND MOTOR VEHICLE

CROSS-REFERENCE TO RELATED APPLICATIONS

This application is a National Phase Application of PCT International Application No. PCT/EP2012/003387, International Filing Date Aug. 8, 2012, claiming priority from German Patent Application No. 10 2011 111590.4, filed Aug. 25, 2011, which is hereby incorporated by reference.

FIELD OF INVENTION

The present invention relates to an exhaust-gas treatment device for processing exhaust gas from a combustion aggregate, especially a diesel engine. Moreover, the present invention relates to a method for processing exhaust gas from a combustion aggregate by means of selective catalytic reaction, and it also relates to a motor vehicle in which the method according to the invention is implemented or which has the exhaust-gas treatment device according to the invention.

A thorough and efficient purification of the exhaust gases from an internal combustion engine can be carried out by adding a reducing agent to the exhaust gas in an exhaust-gas after-treatment device. Especially with lean internal combustion engines in which an excess of air is present for the combustion as compared to a stoichiometric fuel-air mixture, the $NO_x$ compounds in the exhaust gas are reduced. Ammonia is normally employed as the reducing agent. When the temperatures of the exhaust gas are sufficiently high, the $NO_x$ compounds are reduced together with the ammonia to form harmless constituents such as water and nitrogen.

Due to the tight installation space in the engine area of a vehicle, the reducing agent is usually added in the underbody area and thus in the exhaust-gas system situated there. Often, two-part reduction catalysts or else two separate reduction catalysts are arranged in the underbody area. This entails a certain amount of production and installation work as well as an elevated energy demand in order to heat the catalysts that are located in the underbody area to the required operating temperature. This is usually done by means of an electric heater on or in the reduction catalysts, or else by so-called delayed combustion of fuel in the internal combustion engine. This means that the internal combustion engine cannot optimally convert the chemical energy of the fuel into kinetic energy for the motor vehicle. Moreover, due to the delayed combustion of fuel in the reduction catalysts, only temperatures of about 400° C. to 450° C. [752° F. to 842° F.] can be achieved.

Feeding heat into the reduction catalysts serves, on the one hand, to heat the exhaust gas in order to attain the required reduction and, on the other hand, to heat the reducing agent so that the water fraction present there is converted into a gas phase as quickly as possible.

BACKGROUND OF THE INVENTION

German patent application DE 102 50 050 A1 discloses that the efficiency of the reduction catalyst can be increased if combustion heat of an internal combustion engine is utilized.

Furthermore, German patent application 10 2008 051 496 A1 indicates that a high exhaust-gas temperature is beneficial for the operation of the reduction catalyst.

German patent application DE 103 23 607 A1 describes a device that is used for the exhaust-gas purification of an internal combustion engine and that has an oxidation catalyst, a particle filter and a reduction catalyst. The reduction catalyst is combined into one structural unit together with the particle filter.

SUMMARY OF THE INVENTION

The present invention is based on the objective of putting forward a device as well as a method with which the $NO_x$ compounds in the exhaust gas can be reduced efficiently and cost-effectively.

This objective is achieved by the inventive exhaust-gas treatment device according to claim 1 as well as by the inventive method for treating exhaust gas from an internal combustion aggregate according to claim 10. Moreover, according to claim 13, a motor vehicle is being put forward that comprises an exhaust-gas treatment device according to the invention.

According to the invention, an exhaust-gas treatment device for processing exhaust gas from a combustion aggregate, especially a diesel engine, is being put forward, whereby the exhaust-gas treatment device has an exhaust-gas system and, arranged in it, an oxidation catalyst, a reduction catalyst for selective catalytic reduction, and a particle filter, whereby the oxidation catalyst is arranged upstream from the reduction catalyst and the reduction catalyst is arranged upstream from the particle filter. According to the invention, it is provided that the reduction catalyst is arranged in the exhaust-gas system so far upstream in the direction of flow of the exhaust gas that the heat of the exhaust gas passing the reduction catalyst is sufficient to bring the reduction catalyst to the operating temperature. The heat of the exhaust gas passing the reduction catalyst is the heat of the exhaust gas from the combustion aggregate, if applicable, minus any heat losses due to the transport of the exhaust gas from the combustion aggregate to the reduction catalyst. Thus, the exhaust gas heat is the heat that is generated during the exothermic combustion of the fuel in the combustion aggregate. Consequently, the invention has the advantage that, after the exothermic reaction in the combustion aggregate, the temperature of the exhaust gas can be utilized to break down the reducing agent ammonia as well as to reduce $NO_x$ compounds together with ammonia to form harmless substances such as water and nitrogen. The reduction catalyst is preferably a so-called SCR (selective catalytic reduction) catalyst that converts a reducing agent such as, for example, urea, or a reducing agent precursor such as, for example, a urea-water solution, into ammonia which is then selectively catalytically converted with $NO_x$ to form nitrogen and water. In this manner, the emissions of nitrogen oxides can be reduced by as much as 90%.

According to the invention, such a reduction catalyst is arranged in the exhaust-gas system so far upstream in the direction of flow of the exhaust gas that the heat of the exhaust gas passing the reduction catalyst is sufficient to break down the reducing agent and/or to reduce the nitrogen compounds together with ammonia to form the above-mentioned harmless substances such as water and nitrogen. The inventive arrangement of the reduction catalyst downstream from the oxidation catalyst entails the advantage of an additional utilization of the heat from the exhaust gas after the exothermic reaction in the oxidation catalyst. This means that the oxidation catalyst in the operating state likewise raises the temperature of the exhaust gas, so that the reduction catalyst located downstream can be operated even more efficiently.

Thanks to the optimal reduction in the reduction catalyst, processed exhaust gases reach the downstream particle filter.

Moreover, an exhaust-gas turbocharger can also be arranged in the exhaust-gas system whereby, in such a case, the reduction catalyst is arranged upstream from the exhaust-gas turbocharger since the temperature of the exhaust gas is higher there than at a place downstream from the exhaust-gas turbocharger.

The efficiency of the reduction catalyst can be increased to about 90% since there is no longer a need for conventional electric heating of the reducing agent or a delayed combustion, so that, all in all, the $CO_2$ emissions can be reduced and/or less fuel needs to be used.

In preferred embodiments, it is provided that the reduction catalyst is arranged so far upstream that the exhaust gas passing the reduction catalyst still retains at least 40%, and in an especially preferred embodiment, at least 80%, of the temperature that the exhaust gas has immediately after the combustion in the combustion aggregate. Therefore, the invention relates to an exhaust-gas treatment device through which exhaust gas flows when it is connected to a combustion aggregate, whereby the exhaust gas that is flowing along the reduction catalyst still retains at least 40% of the temperature that the exhaust gas has immediately after the combustion in the combustion aggregate. Preferably, the location of the reduction catalyst should be so close to the combustion aggregate that the exhaust gas passing the reduction catalyst has a temperature of at least 60%, and preferably at least 80%, and in an especially favorable embodiment at least 90%, of the temperature of the exhaust gas immediately after the combustion in the combustion aggregate.

The exhaust-gas system in which the reduction catalyst is arranged preferably has a connector to connect the exhaust-gas system to the combustion aggregate, so that the reduction catalyst can be arranged as closely as possible to the combustion aggregate. In this context, the exhaust-gas system can have simple line segments or else other aggregates such as, for instance, additional catalysts. The inventive configuration of the exhaust-gas system entails the advantage of a structurally simpler layout of the exhaust-gas system on the underbody of the motor vehicle since it is no longer necessary for the reduction catalyst to be installed on or underneath the underbody.

Owing to the inventive early utilization of the high temperature of the exhaust gas, it is possible to introduce the reducing agent into the exhaust gas at a much earlier point in time than used to be the case, and thus to convert the nitrogen compounds earlier than in conventional reduction methods. Thanks to the inventive early introduction of the reducing agent into the exhaust gas, an early homogenization of the exhaust gas is optimally achieved, in other words, a uniform distribution of the reducing agent in the exhaust gas, so that the reduction can be carried out efficiently.

Moreover, thermal energy from the combustion aggregate can be employed which—by means of heat radiation via the ambient air and/or by means of heat conduction in the solid material of the exhaust-gas system connected to the combustion aggregate—reaches the reduction catalyst, so that the temperature of the exhaust gas is at least the preferred 40%, and preferably more than 80%, of the temperature of the exhaust gas immediately after the combustion process. Owing to the efficient mode of operation of the reduction catalyst that is arranged close to the combustion aggregate, only one reduction catalyst is needed, as a result of which additional space is gained or made available in the underbody area and the installation of the exhaust-gas system is simplified.

In a preferred embodiment of the exhaust-gas treatment device, it is provided that the reduction catalyst has a metering module for the metered introduction of the reducing agent, whereby the metering module has a cooling unit through which a cooling medium can flow and which is configured and designed in such a way that the cooling unit can be flow-connected to a cooling element of the combustion aggregate so that cooling medium from the cooling element can be utilized to cool the metering module. The reducing agent is preferably introduced by injection. The metering module is heated up by the high temperature of the exhaust gas, giving rise to the above-mentioned advantages. The metering module can be cooled in order to simplify and achieve the injection of the reducing agent. Cooling is especially needed when it is anticipated that the metering module will be heated above 80° C. [176° F.] since this causes the urea to age prematurely. For production-related reasons and with an eye towards optimizing the weight, the exhaust-gas treatment device is advantageously configured in such a way that a cooling element of the combustion aggregate can likewise feed the metering module with cooling medium. When a diesel engine is used as the combustion aggregate, the cooling unit of the metering module can be connected to the cooling system of the engine, thus achieving a simple and efficient as well as weight and space-saving cooling of the metering module.

Moreover, particularly for purposes of reducing the volume, it can be provided for the reduction catalyst to be arranged on a module that connects the oxidation catalyst to the particle filter. This module can be a so-called connecting funnel. Such a module is inexpensive to produce and, in a simple manner, it allows a space-saving arrangement of the metering module of the reduction catalyst.

This embodiment of the invention is configured particularly advantageously when the module has a housing through which the exhaust gas can flow and which serves as the housing for the reduction catalyst. In this embodiment, the reducing agent can be injected directly into the housing or into the module.

In an alternative embodiment, it can be provided that the reduction catalyst is arranged directly on the particle filter. This means that the particle filter and the reduction catalyst together form a structural unit which has a small overall volume since the housing of the particle filter partially also serves as the housing for the reduction catalyst.

Moreover, it can be provided for the exhaust-gas treatment device according to the invention to have a low-pressure exhaust-gas return means. This combination of the exhaust-gas treatment device according to the invention with a low-pressure exhaust-gas return means has the advantage of a simple and cost-effective transport of the exhaust gas from the reduction catalyst to the low-pressure exhaust-gas return means, in contrast to conventional embodiments in which the reduction catalyst is located on the underbody of a motor vehicle, an approach which involves considerable structural work in order to transport the exhaust gas from the reduction catalyst to the low-pressure exhaust-gas return means. In contrast to a high-pressure exhaust-gas return means, a low-pressure exhaust-gas return means has the advantage that the entire mass flow of exhaust gas is available via a turbine for purposes of generating power. With a high-pressure exhaust-gas return means, a mass flow of exhaust gas is removed upstream from the turbine and fed back to the aggregate. This mass flow then can no longer be employed to build up the boost pressure.

In an advantageous embodiment, the low-pressure exhaust-gas return means has a cooling element which, in terms of heat, is connected to the metering module of the reduction catalyst in such a way that the cooling element of the low-pressure exhaust-gas return means can be used to cool the metering module. Here, direct or indirect cooling can be implemented. In the case of direct cooling, a direct thermal coupling between the cooling element and the metering module is provided. In the case of indirect cooling, at least one partial stream of a cooling medium of the cooling element is fed to the metering module. This allows a complete or partial cooling of the metering module.

Likewise being put forward according to the invention is a method for processing exhaust gas from a combustion aggregate by means of selective catalytic reduction, especially for processing exhaust gas from a diesel engine. In this process, the exhaust gas flows through an exhaust-gas system coupled to the combustion aggregate, whereby in the exhaust-gas system, there is an oxidation catalyst upstream from a reduction catalyst provided for selective catalytic reduction, the reduction catalyst is located upstream from a particle filter, and the heat of the exhaust gas passing the reduction catalyst is utilized to heat the reduction catalyst to the operating temperature. Here, the heat of the exhaust gas is utilized to heat the reduction catalyst out of its cold state as well as to maintain the operating temperature. In this context, it can be provided that only the heat of the exhaust gas passing the reduction catalyst is utilized to bring the reduction catalyst to the operating temperature or to keep it there. A reducing-agent precursor such as, for instance, gaseous ammonia, or else a reducing-agent precursor solution such as, for example, an aqueous solution with dissolved urea, can be used as the reducing agent. Preferably, the exhaust gas passing the reduction catalyst has a temperature of at least 40%, especially 60%, in a particularly preferred embodiment at least 80%, and in the best possible case, at least 90%, of the temperature of the exhaust gas immediately after the combustion in the combustion aggregate. This means that, after leaving the combustion aggregate, the exhaust gas is not electrically heated once again, but rather, the temperature of the exhaust gas is due exclusively to the exothermic reaction in the combustion process in the combustion aggregate and/or in the oxidation catalyst. Accordingly, a lower temperature of the exhaust gas in the reduction catalyst is due only to heat transfer to the surroundings of the exhaust-gas system downstream from the combustion aggregate.

The reducing agent here can be introduced directly into the particle filter or into a module with which the oxidation catalyst is flow-connected to the particle filter. The reducing agent can be introduced at these places by means of injection into the exhaust gas.

According to the invention, a motor vehicle is also being put forward, especially a motor vehicle powered by a diesel engine, which has an exhaust-gas treatment device according to the invention. This motor vehicle can be configured in such a way that the reduction catalyst has a metering module for the metered introduction of the reducing agent, whereby the metering module has a cooling unit through which a cooling medium can flow and which is flow-connected to a cooling element of the combustion aggregate. As an alternative or in addition, it can be provided that the cooling unit of the metering module is flow-connected to a cooler of an exhaust-gas return system. In both embodiment variants, an existent cooling element can be employed to cool the metering module. A preferred embodiment of the motor vehicle is configured in such a way that the reduction catalyst is arranged above the underbody of the motor vehicle. Preferably, the motor vehicle has only one reduction catalyst, namely, the reduction catalyst in the exhaust-gas treatment device according to the invention, whereby, according to the invention, the reduction catalyst is arranged very close to the engine and thus no longer in the underbody area.

BRIEF DESCRIPTION OF THE DRAWINGS

The invention will be explained below on the basis of embodiments with reference to the accompanying drawings. The following is shown.

DETAILED DESCRIPTION OF THE INVENTION

Figure 1:
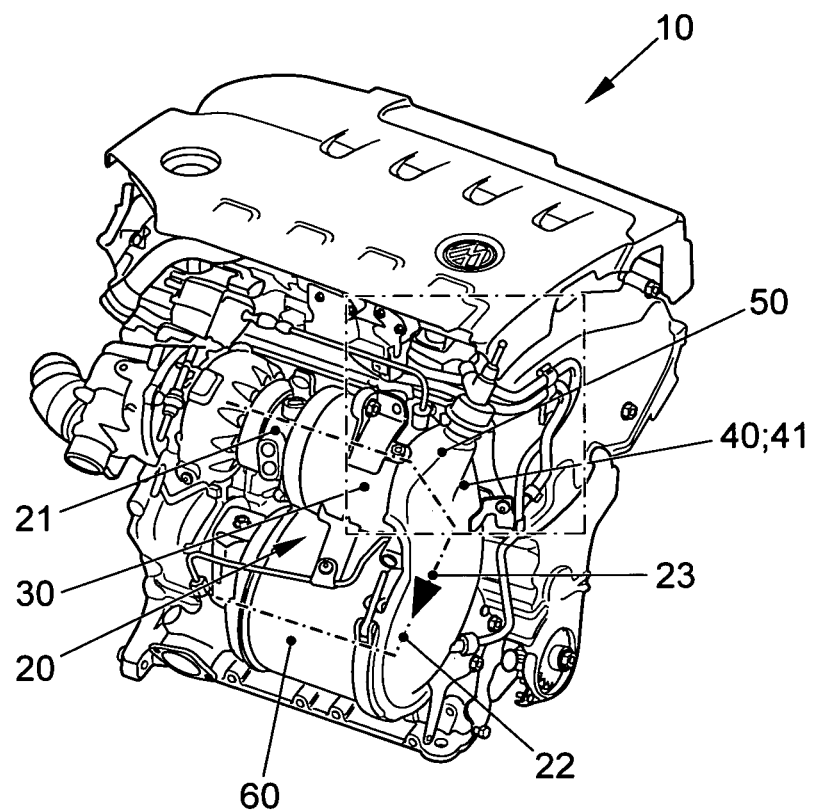
FIG. 1 a combustion aggregate with the exhaust-gas treatment device according to the invention, in a perspective view.

FIG. 1 clearly shows a combustion aggregate 10 on whose exhaust-gas system 20 there is an oxidation catalyst 30 on a connector 21 and, downstream from the oxidation catalyst 30 in the direction of flow of the exhaust gas, there is a reduction catalyst 50 in the exhaust-gas path 22, indicated by a broken line, on a connecting module 40 or on its housing 41. The connecting module 40 leads to a particle filter 60 that is likewise arranged in the exhaust-gas path 22.

This means that the reduction catalyst 50 is situated on the housing 41 of the connecting module 40 between the oxidation catalyst 30 and the particle filter 60.

Therefore, in contrast to conventional embodiments, the reduction catalyst 50 is situated very close to the combustion aggregate 10 or to the connector 21, so that exhaust gas heat generated by the exothermic reaction in the combustion aggregate 10 is utilized to bring the reduction catalyst 50 to the requisite operating temperature or to keep it at that temperature. In this context, it is additionally possible to utilize the heat in the reduction catalyst 50 that is released in an exothermic reaction in the oxidation catalyst 30 since the reduction catalyst 50 is directly adjacent to the oxidation catalyst 30.

Figure 2:
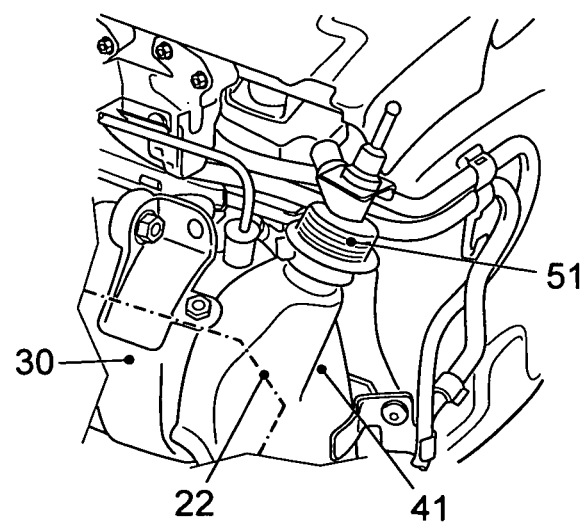
FIG. 2 an enlarged section of the exhaust-gas treatment device shown in FIG. 1.

As can be seen in FIG. 2, the metering module 51 of the reduction catalyst 50 is preferably connected to the connecting module 40 or to its housing.

Figure 3:
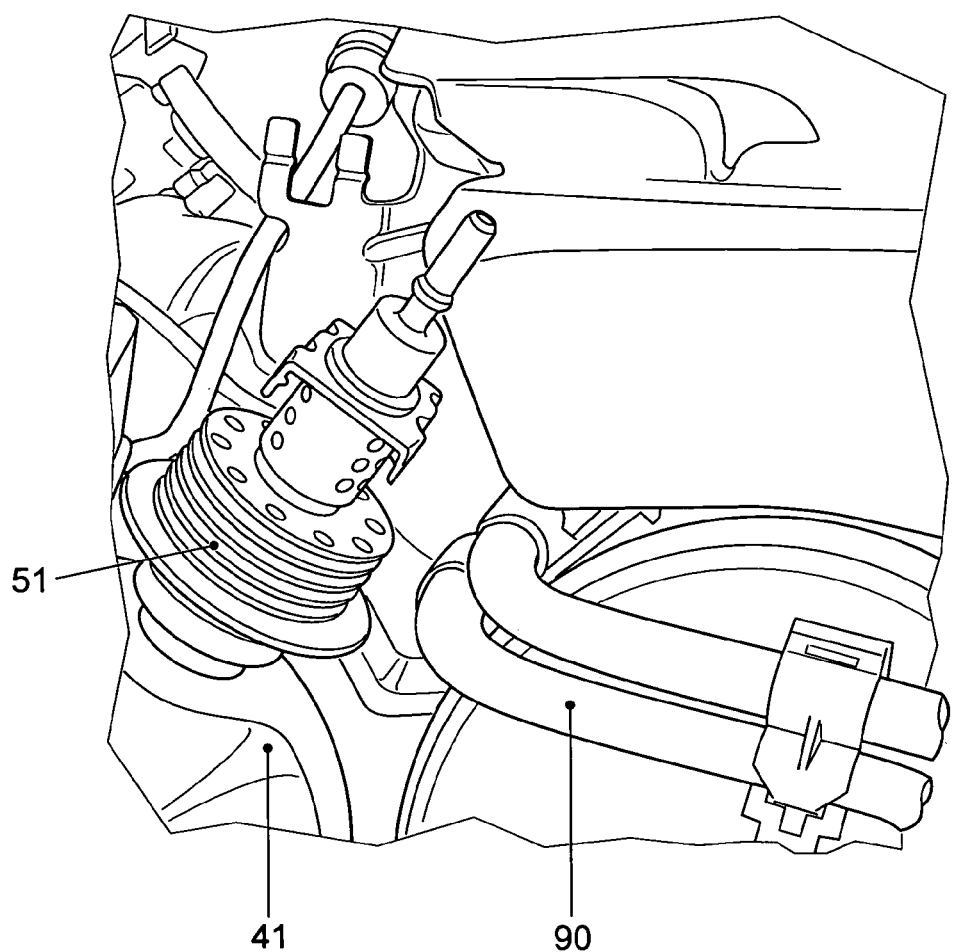
FIG. 3 a metering module of a reduction catalyst.

As can be seen in FIG. 3, in spite of the usually tight installation space available in the engine area, no collisions arise with other components such as, for instance, the collecting pipe 90. The invention should preferably be employed on a diesel engine that is or that will be mounted crosswise.

Figure 4:
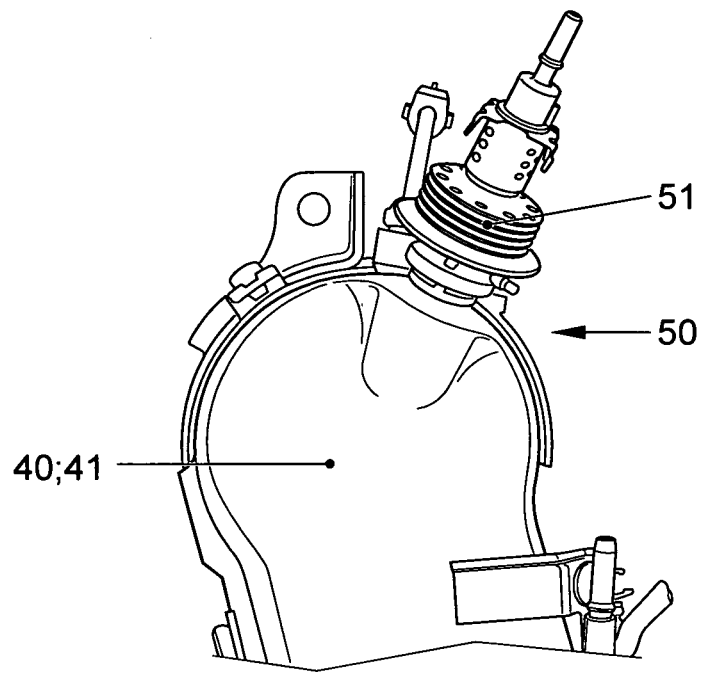
FIG. 4 the reduction catalyst in a view from the side.
Figure 5:
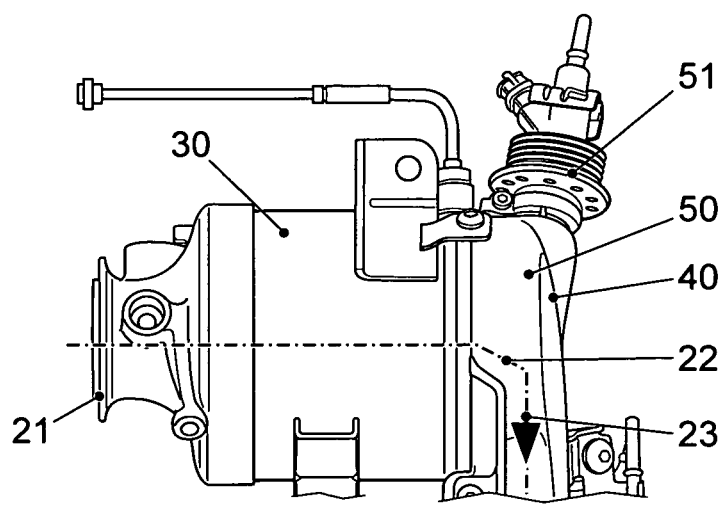
FIG. 5 the oxidation catalyst with a connected reduction catalyst, in a view from the front.

FIGS. 4 and 5 show the practical configuration of the housing 41 of the connecting module 40 so that the reduction can be carried out in this module 40. It can be seen that, in order to carry out the reduction, essentially all that needs to be done is to arrange the metering module 51 on the connecting module 40.

Figure 6:
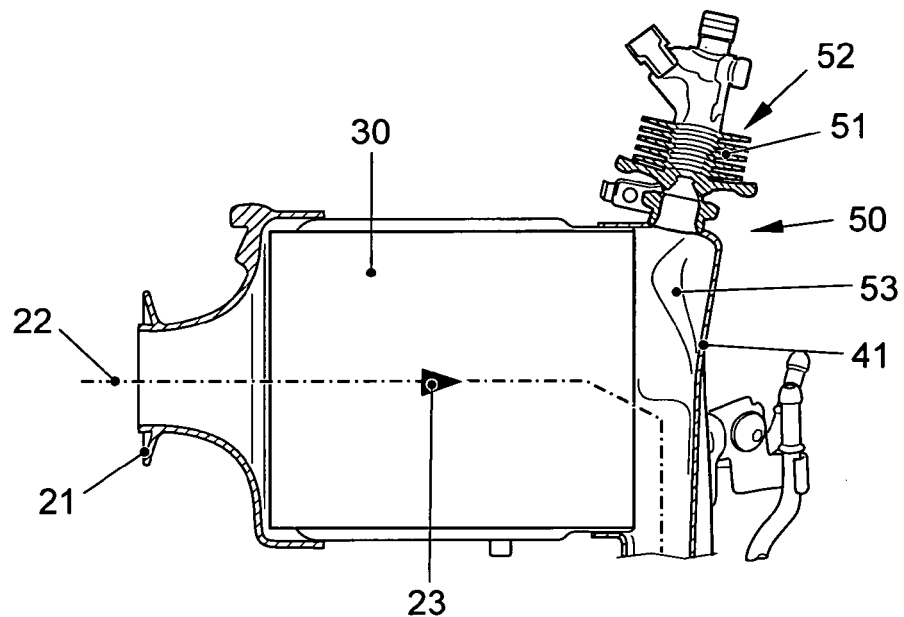
FIG. 6 the oxidation catalyst with a connected reduction catalyst in a side view.

FIG. 6 shows in which area the actual reduction is carried out. The exhaust gas flows along the exhaust-gas path 22 in the flow direction 23 of the exhaust gas through the oxidation catalyst 30 and from there into the housing 41. The metering module 51 of the reduction catalyst 50 attached to this housing 41 makes it possible to introduce the reducing agent into the hot exhaust gas in order to carry out the reduction. In this process, the reducing agent is introduced through the metering module 51 preferably by means of injection 53 as is depicted in the cavity of the housing 41. A cooling unit 52 located on the metering module 51 can be flow-connected to a cooling element of the combustion aggregate 10 and/or can be connected to a cooling element of a low-pressure exhaust-gas return means 70.

Figure 7A:
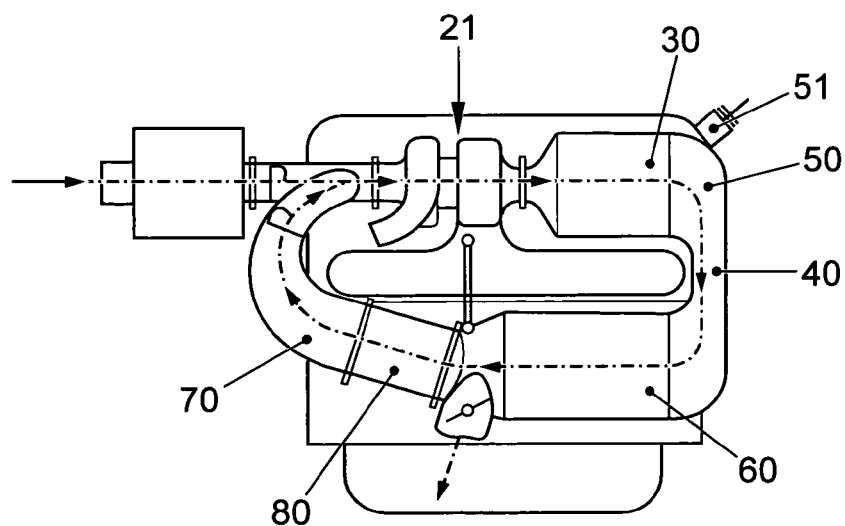
Fig. 7A an exhaust-gas treatment device according to the invention, with an integrated low-pressure exhaust-gas return means.
Figure 7B:
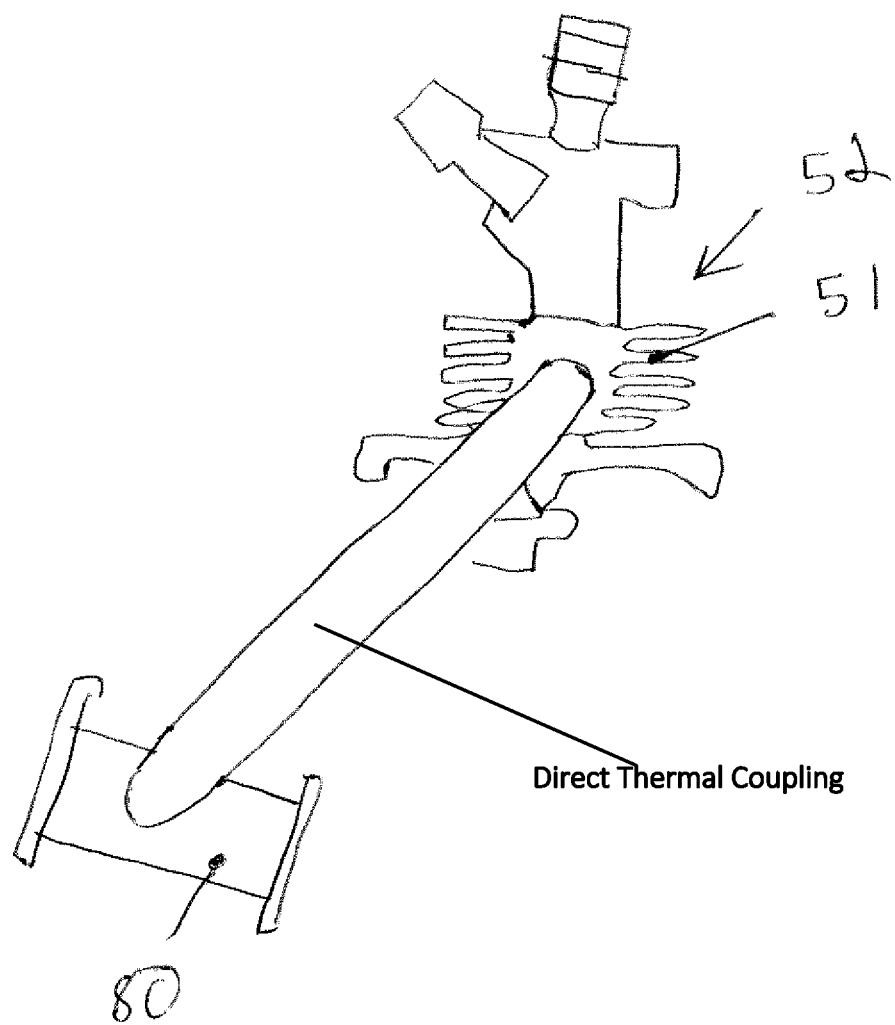
Fig. 7B an exhaust-gas treatment device according to the invention, with a direct thermal coupling between a cooling element and a metering module.
Figure 7C:
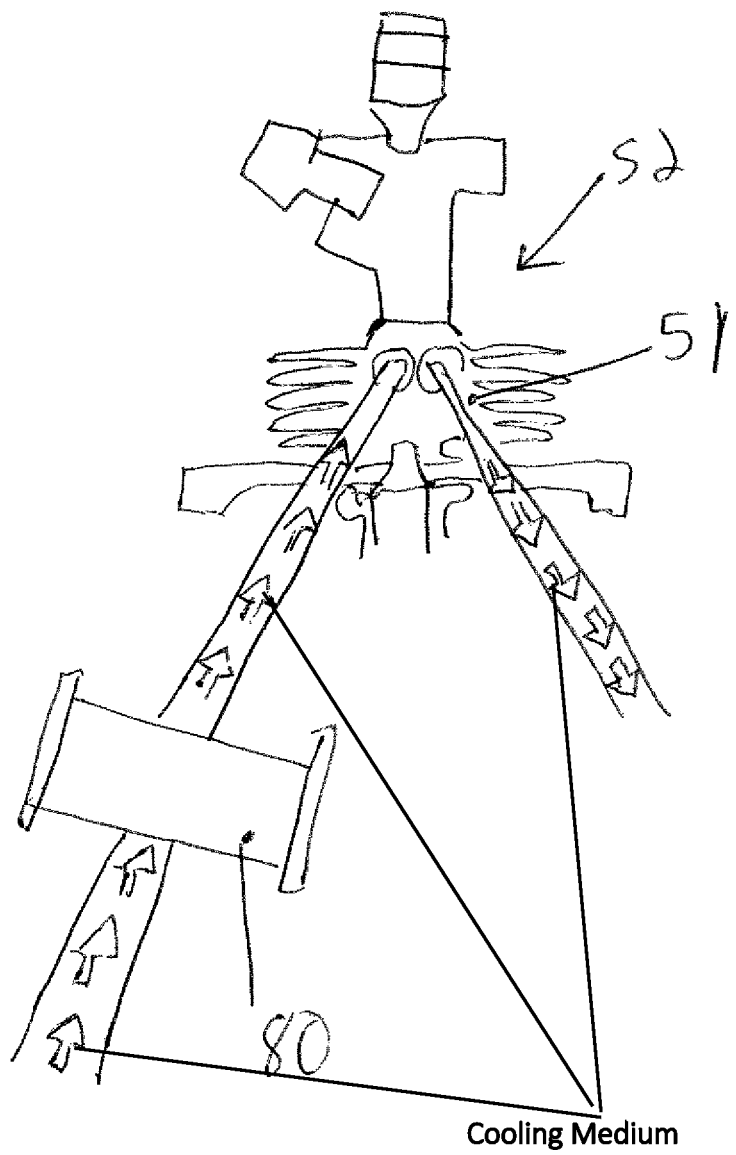
FIG. 7C an exhaust-gas treatment device according to the invention, wherein at least one partial stream of a cooling medium of a cooling element is fed to the metering module.

The arrangement of such a low-pressure exhaust-gas return means 70 can be seen in Figure 7A. It can be seen that the low-pressure exhaust-gas return means 70 is adjacent to the particle filter 60 in the exhaust-gas path 22. The low-pressure exhaust-gas return means 70 advantageously has a cooling element 80 which, as already described, can be connected to the cooling unit 52 of the metering module 51 of the reduction catalyst 50. With an appropriate design of the cooling element 80 of the combustion aggregate 10 or of the low-pressure exhaust-gas return means 70, the metering module 51 of the reduction catalyst 50 can be cooled easily and efficiently, without the need to provide additional cooling aggregates on the reduction catalyst 50, since this would take up space. The cooling element 80 can directly cool the metering module 51, as can be seen in FIG. 7B. It can be seen that a direct thermal coupling between the cooling element 80 and the metering module 51 is provided. The cooling element 80 can indirectly cool the metering module 51, as can be seen in FIG. 7C. It can be seen that at least one partial stream of a cooling medium of the cooling element 80 is fed to the metering module 51. This allows a complete or partial cooling of the metering module.

Figure 8:
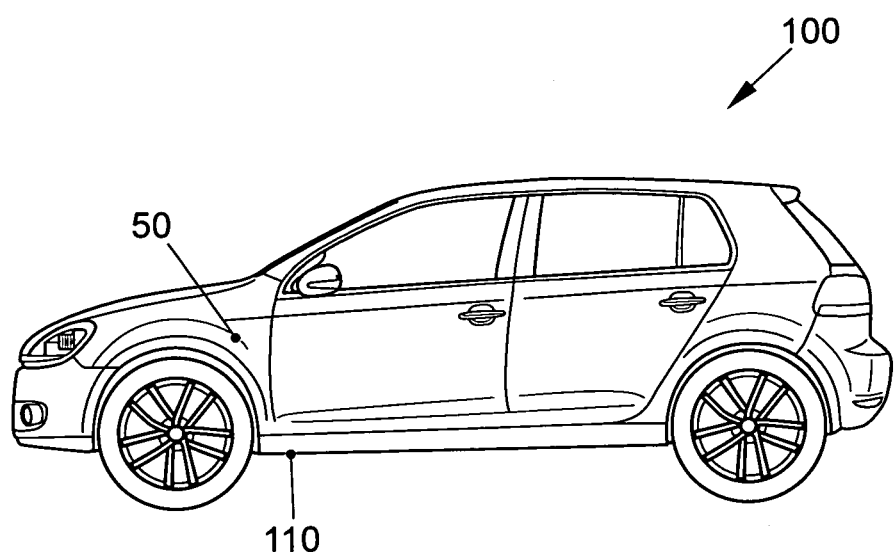
FIG. 8 a motor vehicle in a view from the side.

FIG. 8 shows that the reduction catalyst 50 should preferably be arranged in the engine compartment of the motor vehicle 100, namely as closely as possible to the combustion aggregate 10. This means that the reduction catalyst 50 is arranged above the underbody 110 of the motor vehicle.

LIST OF REFERENCE NUMERALS

10 combustion aggregate
20 exhaust-gas system
21 connector
22 exhaust-gas path
23 exhaust-gas flow direction
24 oxidation catalyst
40 connecting module
41 housing
50 reduction catalyst
51 metering module
52 cooling unit
53 injection
60 particle filter
70 low-pressure exhaust-gas return means for the cooling element
80 cooling element
90 collecting pipe
100 motor vehicle
110 motor vehicle underbody

The invention claimed is:

1. An exhaust-gas treatment device for processing exhaust gas from a combustion aggregate, the exhaust-gas treatment device comprising:
   an exhaust-gas system having arranged therein an oxidation catalyst, a reduction catalyst configured for selective catalytic reduction and having a metering module configured for metered introduction of a reducing agent, and a particle filter, the metering module having a cooling unit through which a cooling medium flows,
   wherein the oxidation catalyst is arranged upstream from the reduction catalyst and the reduction catalyst is arranged upstream from the particle filter,
   wherein the reduction catalyst is arranged in the exhaust-gas system upstream in a direction of flow of the exhaust gas such that heat of the exhaust gas passing the reduction catalyst is sufficient to bring the reduction catalyst to an operating temperature,
   wherein the exhaust-gas treatment device further comprises a low-pressure exhaust-gas return means having a cooling element flow-connected to the cooling unit of the metering module of the reduction catalyst such that the cooling medium from the cooling element of the low-pressure exhaust-gas return means cools the metering module.

2. The exhaust-gas treatment device for processing exhaust gas according to claim 1, wherein the exhaust gas passing the reduction catalyst still retains at least 40% of a temperature that the exhaust gas has immediately after combustion in the combustion aggregate.

3. The exhaust-gas treatment device for processing exhaust gas according to claim 1, wherein the exhaust gas passing the reduction catalyst still retains at least 80% of a temperature that the exhaust gas has immediately after the combustion in combustion aggregate.

4. The exhaust-gas treatment device for processing exhaust gas according to claim 1, wherein the reduction catalyst is arranged on a connecting module that connects the oxidation catalyst to the particle filter.

5. The exhaust-gas treatment device for processing exhaust gas according to claim 4, wherein the connecting module has a housing through which the exhaust gas can flow and which serves as a housing for the reduction catalyst.

6. The exhaust-gas treatment device for processing exhaust gas according to claim 1, wherein the reduction catalyst is arranged on the particle filter.

7. A method for processing exhaust gas from a combustion aggregate by means of selective catalytic reduction via a metering module configured for metered introduction of a reducing agent, comprising:
   providing, in an exhaust-gas system, an oxidation catalyst upstream from a reduction catalyst configured for selective catalytic reduction, wherein the reduction catalyst is located upstream from a particle filter,
   using heat of the exhaust gas passing the reduction catalyst to heat the reduction catalyst to an operating temperature cooling the metering module via a cooling element of a low-pressure exhaust-gas return means, the cooling element of the low-pressure exhaust-gas return means being flow-connected to a cooling unit of the metered module of the reduction catalyst such that the cooling medium from the cooling element of the low-pressure exhaust-gas return means cools the metering module.

8. The method for processing exhaust gas according to claim 7, wherein only heat of the exhaust gas passing the reduction catalyst is used to bring the reduction catalyst to the operating temperature.

9. The method for processing exhaust gas according to claim 7, wherein the reducing agent is injected directly into the particle filter or into a module which flow-connects the oxidation catalyst to the particle filter.

10. A motor vehicle system comprising an exhaust-gas treatment device for processing exhaust gas from a combustion aggregate, the exhaust-gas treatment device comprising:

an exhaust-gas system having arranged therein an oxidation catalyst, a reduction catalyst configured for selective catalytic reduction and having a metering module configured for metered introduction of a reducing agent, and a particle filter, the metering module having a cooling unit through which a cooling medium flows, wherein the oxidation catalyst is arranged upstream from the reduction catalyst and the reduction catalyst is arranged upstream from the particle filter, wherein the reduction catalyst is arranged in the exhaust-gas system upstream in a direction of flow of the exhaust gas such that heat of the exhaust gas passing the reduction catalyst is sufficient to bring the reduction catalyst to an operating temperature, wherein the exhaust-gas treatment device further comprises a low-pressure exhaust-gas return means having a cooling element flow-connected to the cooling unit of the metering module of the reduction catalyst such that the cooling medium from the cooling element of the low-pressure exhaust-gas return means cools the metering module.

11. The motor vehicle system according to claim 10, wherein the reduction catalyst is arranged above an underbody of a motor vehicle.

* * * * *